US007519799B2

(12) United States Patent
Hebda et al.

(10) Patent No.: US 7,519,799 B2
(45) Date of Patent: Apr. 14, 2009

(54) APPARATUS HAVING A MICRO-INSTRUCTION QUEUE, A MICRO-INSTRUCTION POINTER PROGRAMMABLE LOGIC ARRAY AND A MICRO-OPERATION READ ONLY MEMORY AND METHOD FOR USE THEREOF

(75) Inventors: Rebecca E. Hebda, Tigard, OR (US); Jourdan J. Stephan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/714,674

(22) Filed: Nov. 18, 2003

(65) Prior Publication Data

US 2005/0108508 A1    May 19, 2005

(51) Int. Cl.
  *G06F 7/38* (2006.01)
  *G06F 9/00* (2006.01)
  *G06F 9/44* (2006.01)
  *G06F 15/00* (2006.01)

(52) U.S. Cl. .................................... 712/245; 712/211

(58) Field of Classification Search .................. 712/211, 712/245
See application file for complete search history.

(56) References Cited

U.S. PATENT DOCUMENTS 5,630,083 A * 5/1997 Carbine et al. .............. 712/212
5,765,220 A * 6/1998 Kipp .......................... 711/220

* cited by examiner

*Primary Examiner*—Eddie P Chan
*Assistant Examiner*—John Lindlof
(74) *Attorney, Agent, or Firm*—Kenyon & Kenyon LLP

(57) ABSTRACT

Embodiments of the present invention relate to high-performance processors, and more specifically, to processors that store all operation information associated with each instruction in a single memory. A processor including multiple programmable logic arrays (PLAs); an instruction pointer queue coupled to the multiple PLAs; and an instruction pointer sequencing logic/predictor component coupled to the instruction pointer queue. The processor further includes a micro-operation cache coupled to the instruction pointer sequencing logic/predictor component; a micro-operation memory coupled to the micro-operation cache; and a trace pipe (TPIPE) coupled to the micro-operation cache and the instruction pointer queue.

40 Claims, 4 Drawing Sheets

APPARATUS HAVING A MICRO-INSTRUCTION QUEUE, A MICRO-INSTRUCTION POINTER PROGRAMMABLE LOGIC ARRAY AND A MICRO-OPERATION READ ONLY MEMORY AND METHOD FOR USE THEREOF

FIELD OF THE INVENTION

Embodiments of the present invention relate to high-performance processors, and more specifically, to processors that store all operation information associated with each instruction in a single memory.

BACKGROUND

Currently, programmable logic arrays ("PLAs") provide micro-operation information for short instruction flows of usually four or less micro-operations while a micro-operation read only memory ("ROM") is used to provide micro-operation information for long instruction flows of more than four micro-operations. This is accomplished in the processor by using a traditional decoder to decode the instructions and a trace cache to hold the short instructions and a micro-operation ROM to store the long instructions. Unfortunately, processor efficiency suffers on long instructions because of the processor switch to the slower UROM to access the long instructions. In addition, making changes to improve the access speed of one memory usually results in decreasing the access speed of the other memory. As a result, there is a large penalty (also referred to as "pipeline bubbles") for switching from one instruction source to the other, for example, from the trace cache to the micro-operation ROM. If they were unified, there would be no penalty. An inherent benefit to using a single structure to store all of the instructions is to reduce the hardware complexity. Having a single storage structure results in less hardware to design, less potential speedpaths, etc.

Therefore, it would be advantageous to have all micro-operation information come from a single structure.

DETAILED DESCRIPTION

In accordance with an embodiment of the present invention, all micro-operation information may be stored in a single micro-operation read only memory ("ROM"). Thus, all instruction information, regardless of whether they are short or long instructions, as defined by the number of micro-operations required to execute the instruction, may be stored in a single location. Unfortunately, the read latency for the UROM may be prohibitively slow, especially on critical flows. Therefore, a micro-operation cache may be used to store micro-operation information for the most commonly used instructions and/or micro-operations that are read from the UROM. The advantage of this configuration is that all micro-operation information would come from a single structure, instead of receiving information for short instructions from programmable logic arrays ("PLAs") and receiving information for long instructions from a UROM. As a result, the processor may no longer need to switch between structures to access short and long instructions, since all instructions are treated equally. Therefore, micro-operations from both short and long instructions may be stored in the micro-operation cache.

The PLAs may provide micro-operation instruction pointers ("UIPs") or instruction pointers to select the correct micro-operation information from the UROM, for example, the first micro-operation for each instruction. The UIPs may be stored in a queue, for example, a UIP queue, until they can be used as read pointers into the UROM. The UIP queue may, for example, only store the first UIP of each instruction (Beginning of Macro-instruction or "BOM"), while other circuitry may be used to determine subsequent UIP values for subsequent micro-operations in the instruction flow.

Figure 1:
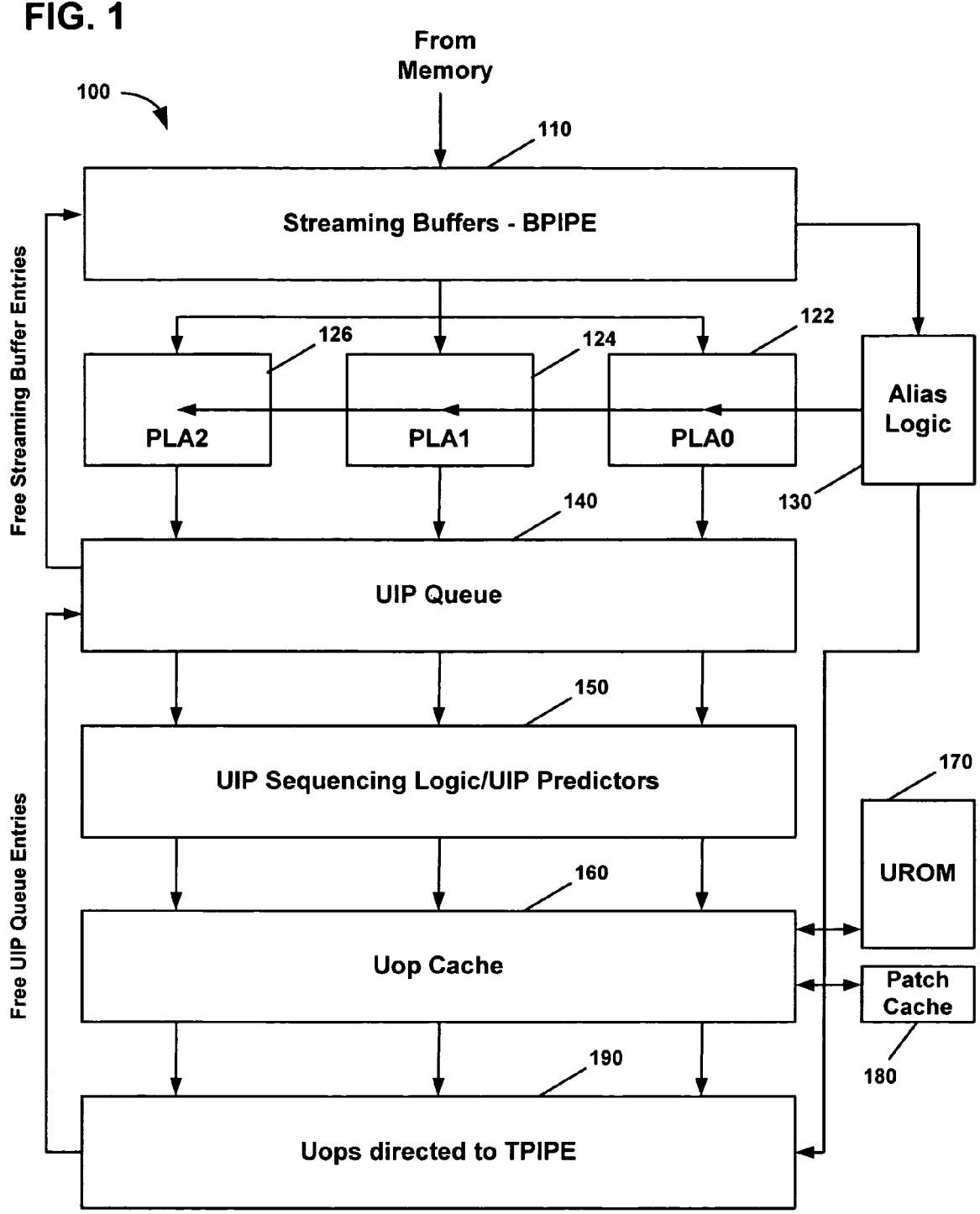
FIG. 1 is an out-of-order processor including a plurality of programmable logic arrays, a micro-operation instruction pointer queue and a micro-operation cache, in accordance with an embodiment of the present invention.

Embodiments of the present invention may be described by referring to an out-of-order processor 100, depicted in FIG. 1. Not all functional units of processor 1 are depicted in FIG. 1. For a Complex Instruction Set Computer ("CISC") architecture, processor 100 may decode a complex instruction into one or more micro-instructions. Usually, these micro-instructions define a load-store type architecture, so that micro-instructions involving memory operations may be practiced for other architectures, such as Reduced Instruction Set Computer ("RISC") or Very Large Instruction Word ("VLIW") architectures. In a RISC architecture, instructions are not decoded into micro-instructions. Because the present invention may be practiced for RISC architectures as well as CISC architectures, no distinction is made between instructions and micro-instructions unless otherwise stated, and simply refer to these as instructions.

FIG. 1 is an out-of-order processor 100 including a plurality of programmable logic arrays, a micro-operation instruction pointer queue and a micro-operation cache, in accordance with an embodiment of the present invention in FIG. 1, out-of-order processor 100 may include a build pipe ("BPIPE") 110, which may receive bytes from a memory, for example, a main memory and/or cache memory, and break them into manageable chunks using byte markers in the byte stream that indicate where instructions begin and end. The memory may include, for example, random access memory ("RAM"); dynamic RAM ("DRAM"); Rambus® DRAM ("RDRAM®"), which is licensed by Rambus, Inc. of Mountain View, Calif.; static RAM ("SRAM"), and the like. Each instruction in BPIPE 110 may be assigned a streaming buffer entry, generally, in program order. BPIPE 110 may be coupled to multiple PLAs 122, 124, 126 and to an alias logic unit 130, which may receive all of the instruction bytes from BPIPE 110. Although only three PLAs 122,124,126 are shown in the embodiment in FIG. 1, other embodiments are contemplated in which less than three and/or four or more PLAs may be coupled to BPIPE 110. Each PLA 122,124, 126 may also be coupled to alias logic unit 130, which may provide processor mode information, flow markers and alias information to PLAs 122, 124,126. PLAs 122, 124,126 may receive an instruction byte stream from BPIPE 110 and may decode the instruction byte stream. In general, the byte stream may only contain the first few bytes of the instructions, state bits (for example, 16-bit, 32-bit, etc.) and pre-decoded information. Each PLA 122, 124, 126 may output to a UIP queue 140 an instruction pointer for the first micro-operation in the instruction that is associated with the streaming buffer entry assigned to the instruction by BPIPE 110. The alias logic in alias logic unit may operate in parallel with PLAs 122, 124, 126 so they may also forward the necessary instruction information to a micro-operation ROM ("UROM") 170.

In FIG. 1, in accordance with an embodiment of the present invention, PLAs 122, 124, 126 may be responsible for providing UIPs for each decoded opcode value received from BPIPE 110. Each PLA 122, 124, 126 may determine whether the instruction includes a single micro-operation or multiple micro-operations and provide a UIP for the BOM of each of the macro-instructions in BPIPE 110 using de-coded information, for example, flow length, associated with the micro-operation. The UIP for each BOM may be used as a read index into micro-operation cache 160 and/or UROM 170. Each of PLAs 122, 124, 126 also may output a prediction about the number of sets contained in each micro-operation flow sent to it before a last micro-operation (End of Macro-instruction or "EOM") to improve performance on medium length flows, for example, flows with 4 to 12 micro-operations. Similarly, an EOM predictor may be included to predict the EOM for longer flows, for example, flows with more than 12 micro-operations, since the normal read latency of the EOM predictor may be 3 cycles, which is too long for short and medium length flows. In the present embodiment with three PLAs 122, 124, 126, a single micro-operation flow may appear in different locations in UIP space, while flows with 2 or more micro-operations may be output from all of PLAs 122, 124, 126. Thus, a two micro-operation flow may never be handled in the same cycle as a single micro-operation flow.

In FIG. 1, in accordance with an embodiment of the present invention, UIP queue 140 may associate each instruction pointer with a UIP queue entry store each instruction pointer and its associated UIP queue entry. As above, the UIP queue entries are issued in program order as the UIPs arrive in UIP queue 140. UIP queue 140, generally, may be as wide as the number of PLAs. Therefore, in the present embodiment having three PLAs, UIP queue 140 would be a three-wide queue. In alternate embodiments, if, for example, there are only two PLAs, UIP queue 140 may be a two-wide queue and if there are four or more PLAs, UIP queue 140 may be a four or more-wide queue depending on the number of PLAs. In FIG. 1, UIP queue 140 also may be coupled to BPIPE 110 to output and return to BPIPE 110 any free streaming buffer entry values that may be reused.

In FIG. 1, in accordance with an embodiment of the present invention, UIP queue 140 may be coupled to an UIP sequencing logic/UIP predictor component 150, which may be as wide as UIP queue 140, for example, three-wide, in the present embodiment. In the present embodiment, UIP sequencing logic/UIP predictor component 150 may receive up to three instruction pointers for the first micro-operation in three different instructions from UIP queue 140 and request the micro-operations from a local memory, for example, a micro-operation cache 160 and/or a UROM 170. UIP sequencing logic/UIP predictor component 150 may choose a UIP address to be used to access micro-operation cache 160 and/or UROM 170 by selecting either the UIP from the UIP queue, a next UIP from UROM 170, a UIP+1 value, or a predicted Next UIP. UIP sequencing logic/UIP predictor component 150 also may predict the number of micro-operations in each instruction and may be used to predict a next instruction pointer to a next micro-operation in the instruction. In general, most of the instructions flowing through the processor may decode to three or fewer micro-operations. In such cases the prediction and sequencing logic may not be needed, since, in the present embodiment, the instruction pipeline is "three-wide," that is, it may accommodate up to three micro-operations simultaneously. Unfortunately, processing may become more difficult when an instruction decodes to three or more micro-operations, since the PLAs may only provide the UIP for the BOM of each instruction and then begin to work on the BOM for the next instruction. UIP sequencing logic/UIP predictor component 150 may provide the later UIPs for the subsequent micro-operations in each instruction and will be described in greater detail below in relation to FIG. 2.

In FIG. 1, micro-operation cache 160, generally, may be a small structure, for example, 8 KB, that may hold the most commonly used micro-operation/UIP combinations and may be accessed first by processor 100 when trying to locate micro-operations. If a micro-operation is not found in micro-operation cache 160, the micro-operations may be retrieved from UROM 170 and stored in micro-operation cache 160.

In FIG. 1, in embodiments of the present invention, UROM 170 may store all of the micro-operations for all instructions regardless of length so that all of the micro-operations for all of the instructions may be located in a single location.

In FIG. 1, in accordance with an embodiment of the present invention, the most commonly used micro-operations stored in micro-operation cache 160 may also be three-wide to match the other components of processor 100, thus, micro-operation cache 160 may be a three-wide cache. The most commonly used micro-operations may be predetermined and loaded in to micro-operation cache 160 or selected in real-time based on which instructions are actually being seen in the processor during execution of each program and loaded in to micro-operation cache 160. In general, it has been discovered that a core group of approximately 500 instructions are used in about 90 percent of the cases. Micro-operation cache 160 may be coupled to UROM 170, in which all micro-operations for each instruction may be stored. Due to its size, UROM 170 may not be implemented as a patchable structure. However, patching may be implemented by micro-operation cache 160 being coupled to a patch cache 180, in which micro-operations for instructions previously flushed from micro-operation cache 160 may be stored. In operation, when a miss occurs in micro-operation cache 160 parallel reads may be issued to UROM 170 and patch cache 180 for the missing micro-operation. If a hit occurs in patch cache 180, the value(s) from patch cache 180 may be multiplexed into micro-operation cache 160 rather than from UROM 170. If there is not a hit in patch cache 180, the value(s) from UROM 170 may be multiplexed into micro-operation cache 160. In general, the size of patch cache 180 may be independent of the size of micro-operation cache 160 and rather may depend on the specific characteristics of each processor as determined during initial system testing and development.

In FIG. 1, in accordance with the embodiment of the present invention, micro-operation cache 160 may output the micro-operations to a trace pipe ("TPIPE") 190 where the micro-operations for a given instruction may be assembled into an instruction trace, if necessary, to be forwarded for execution. TPIPE 190 may also output freed-up UIP queue entries that had been associated with a micro-operation once the micro-operation is added to the instruction trace. As with micro-operation cache 160 and UIP queue 140, TPIPE 190 may be an equivalent size, for example, in the present embodiment, a three-wide pipe structure. TPIPE 190 also may be coupled to alias logic 130 to receive further details on the machine state that may be used to determine how traces should be built for each instruction.

Figure 2:
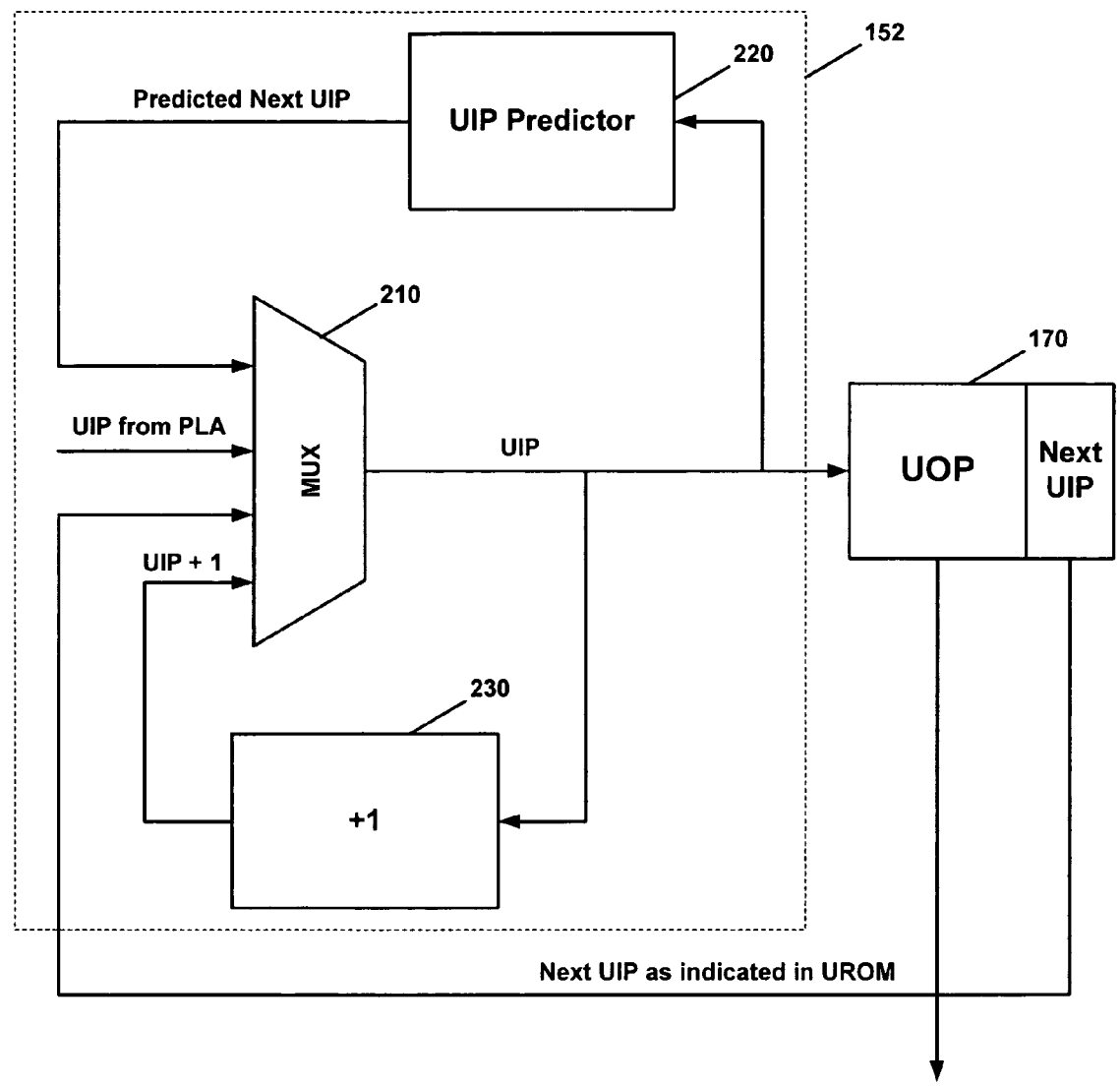
FIG. 2 is a functional block diagram of a next micro-operation instruction pointer logic, in accordance with an embodiment of the present invention.

FIG. 2 is a functional block diagram of next micro-operation instruction pointer logic, in accordance with an embodiment of the present invention. In FIG. 2, a single next UIP prediction circuit 152 is shown that may be coupled to a single PLA, for example, one of PLAs 122, 124, 126, and may determine the next UIP value to be used to read from micro-operation cache 160 or UROM 170. A separate next UIP prediction circuit 152 may be coupled to each PLA 122, 124, 126. In FIG. 2, a multiplexer 210 may be coupled to a PLA to receive a UIP for a first micro-operation in an instruction and to output a next UIP to UROM 170 for a micro-operation. UROM 170 may output a next UIP value associated with the micro-operation that was just read out of UROM 170. Multiplexer 210 also may be coupled to a UIP predictor 220 to receive the UIP from multiplexer 210 and to output a predicted next UIP based on the most recent UIP back to multiplexer 210. Similarly, an incrementer 230 may be coupled to multiplexer 210 to receive the output UIP and to output a UIP+1 value back to multiplexer 210.

In FIG. 2, in accordance with an embodiment of the present invention, for example, single next UIP prediction circuit 152 may receive information from a PLA that the flow is a long flow and may, by default, select the Next UIP to be UIP+1. In general, for a micro-cache with a short read latency, if there are no branch instructions and the end of the flow has not been reached, the micro-operations may be read in order. In an embodiment of the present invention, if the read latency is not short, for example, at least four cycles plus two or more cycles for wire delay and control logic, the throughput may become unacceptable and the prediction logic may override the UIP+1 default, if there appears to be a better choice.

In FIG. 2, in accordance with an embodiment of the present invention, when the EOM is reached, the micro-operations of the next instruction may be retrieved. However, to accomplish this without any delay between reaching the EOM of one instruction and reading the BOM of the next instruction, an EOM predictor may predict that the end of the first flow is about to be encountered. To accomplish this, the EOM predictor may store the EOM UIPs that may be compared against the current UIP and, if there is a match, to read the BOM of the next instruction. A similar situation exists when a branch has been taken during execution. In this situation the Next UIP may be the target of the micro-branch. A predictor structure similar to a branch target buffer ("BTB") may predict the branch targets, which also may be checked against the actual Next UIP that is determined when the micro-operations are read.

In FIG. 2, in accordance with an embodiment of the present invention, the predicted Next UIPs may be checked against the data read from micro-operation cache 160 to determine whether there are any mis-predictions. If there are mis-predictions the appropriate predictors may have to be updated and the correct UIP may be sent to multiplexer 210 to read the correct micro-operation. If an EOM was mis-predicted, the next entry in the UIP queue may have been read. However, it may be necessary to go back and complete a previous flow, so the UIPs currently in UIP queue 140 may need to be saved. In accordance with an embodiment of the present invention, UIP queue 140 may be a circular queue with three pointers. For example, a NextRead pointer may point to the entry with the next UIP to read, a Write pointer may point to the next open location, and a NextChecked pointer may point to the next UIP to be checked by the checker logic in a UIP checker (not shown). In the embodiment, speculative fill buffers in T-PIPE 190 also may send a signal to verify that the entries may be cleared. Both UIP checker and fill buffers may have to have indicated that an entry is "OK" before it may be re-allocated.

Therefore, the write pointer may not go past this pointer and the read pointer may be reset to this pointer, if a mis-prediction is found. When UIP queue 140 is full, any instructions (for the current thread) may be stalled from coming through PLAs 122, 124, 126.

Figure 3:
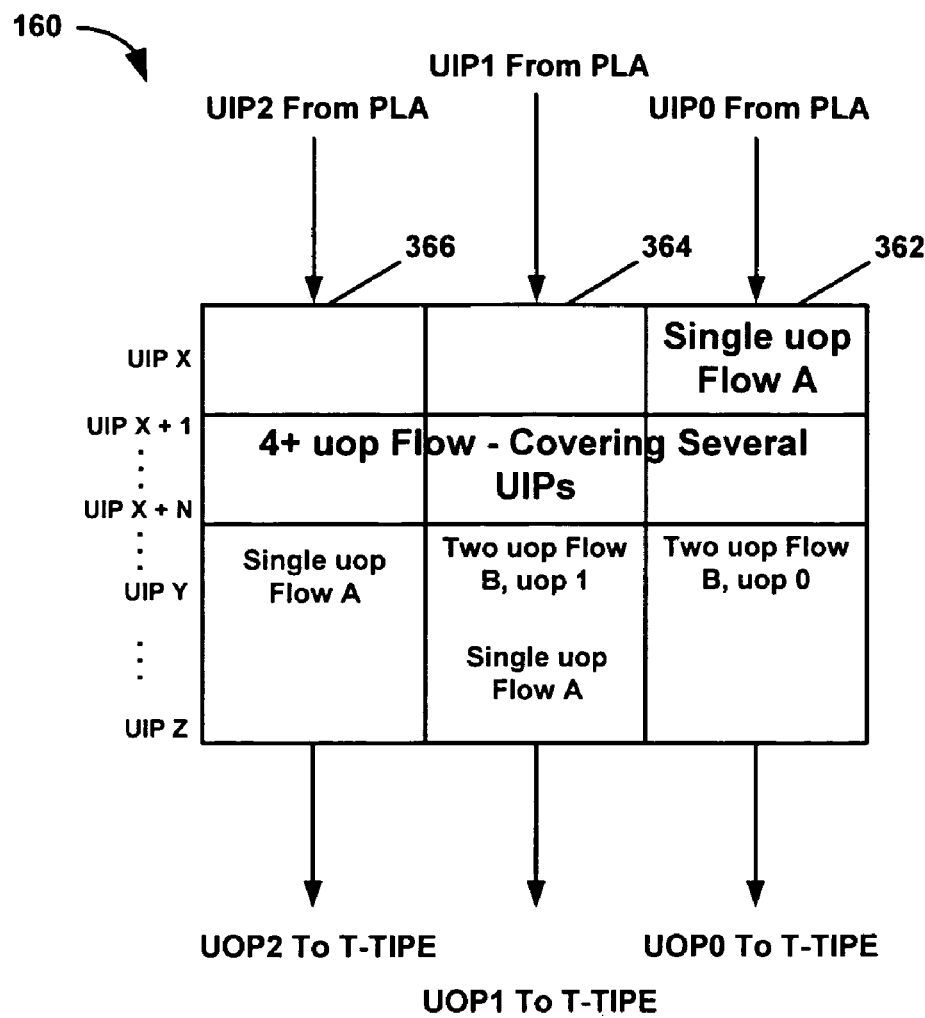
FIG. 3 is a functional block diagram of the structure of a micro-operation read only memory and a micro-operation cache, in accordance with an embodiment of the present invention.

FIG. 3 is a functional block diagram of the structure of a micro-operation read only memory and a micro-operation cache, in accordance with an embodiment of the present invention in FIG. 3, all micro-operations that may be decoded from an instruction set may be contained in UROM 170, which, for example, may hold 48 K micro-operations. Unfortunately, due to its size, UROM 170 may have a huge read latency, for example, from 10 to 20 cycles, which is unacceptable for commonly used micro-operations. Micro-operation cache 160 may hold a subset of the micro-operations, for example, the most frequently used micro-operations. In an embodiment of the present invention, micro-operation cache 160 may be 256 sets by 3 micro-operations wide. Micro-operations may be stored in a set in micro-operation cache 160 using a portion of the UIP as the set and the rest for a tag match and each of the 3 micro-operations may have separate decoder logic. In the present embodiment, this structure may allow for three separate single micro-operation flows to be read in the same cycle. However, as described above, for flows of more than three micro-operations, all 3 decoders may receive the same address. In contrast to UROM 170, micro-operation cache 160 may only have a read latency of, for example, 4 cycles. In general, once a UIP is determined, a read will be attempted in micro-operation cache 160 with the UIP and the micro-operation pointed to by the UIP may be retrieved. If the read misses in micro-operation cache 160, the micro-operations may be read in to micro-operation cache 160 from UROM 170 unless they are marked as being "uncacheable."

Figure 4:
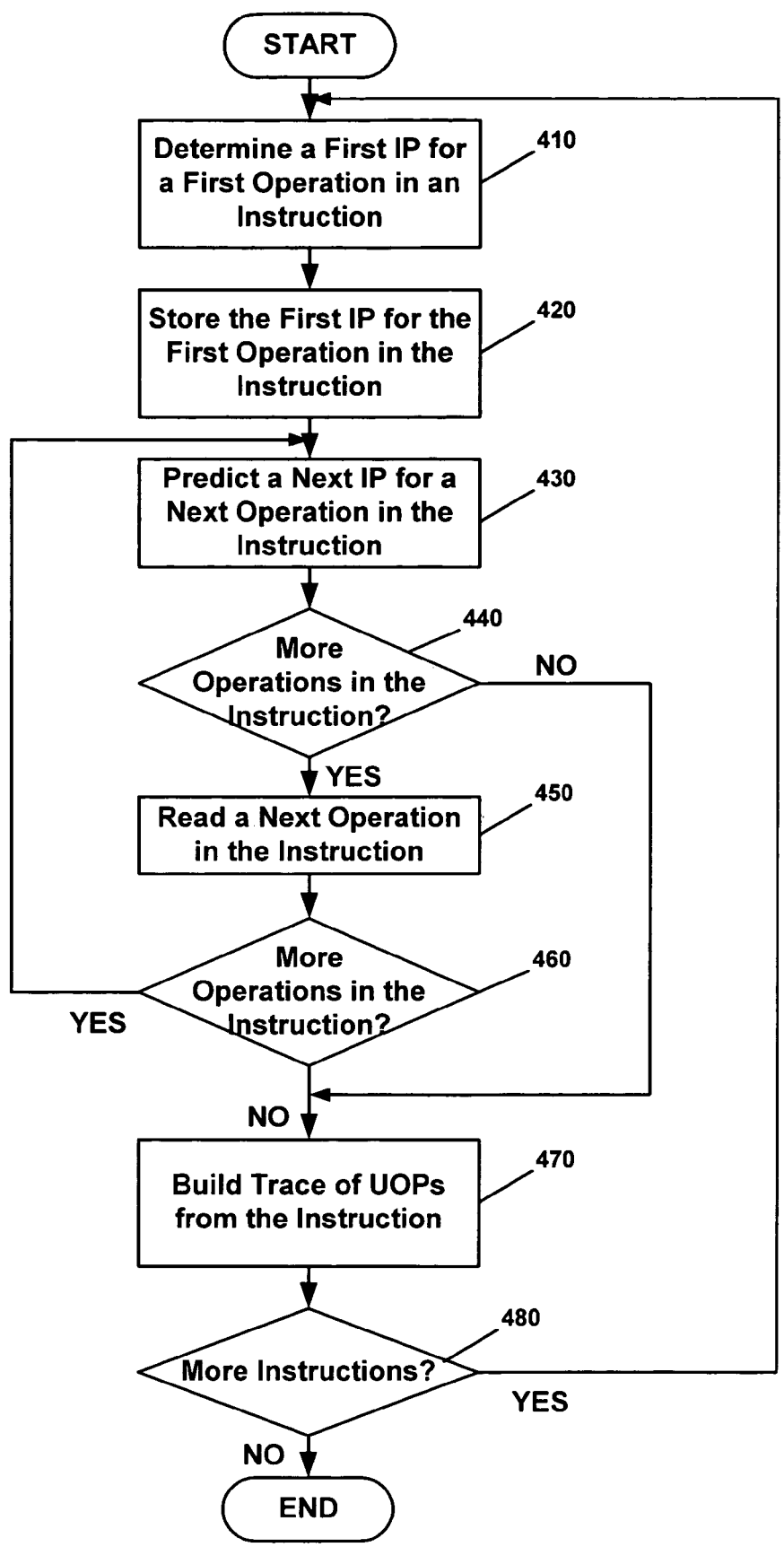
FIG. 4 is a flow diagram of a method, in accordance with an embodiment of the present invention.

FIG. 4 is a flow diagram of a method, in accordance with an embodiment of the present invention in FIG. 4, a first instruction pointer for a first operation in an instruction flow may be determined (410) by one or more of multiple PLAs 122, 124, 126. In addition, one or more of multiple PLAs 122, 124, 126 may predict a number of operations in the instruction. The first instruction pointer for the instruction may be stored (420) in UIP queue 140. A next instruction pointer may be predicted (430) for a next operation in the instruction by UIP sequencing logic/UIP predictor 150. Whether a next UIP for the flow was predicted may be determined (440). If a next UIP was predicted, the next operation in the instruction may be read (450). Whether the instruction contains more operations may be determined (460) by UIP sequencing logic/UIP predictor 150 and, if so, the method may loop back and a next instruction pointer may be predicted (430). If it was determined (450) that there are no more operations associated with the instruction, or it was previously determined (440) that a next UIP was not predicted, a trace of the micro-operations from the instruction may be built (460) in TPIPE 190. Whether there are more instructions available may be determined (480) by UIP sequencing logic/UIP predictor 150 and, if more are determined (480) to be available, the method may loop back to determine (410) the first instruction pointer in the next instruction. If no more instructions are determined (480) to be available, the method may terminate.

Although the present invention has been disclosed in detail, it should be understood that various changes, substitutions, and alterations may be made herein. Moreover, although software and hardware are described to control certain functions, such functions can be performed using either software, hardware or a combination of software and hardware, as is well known in the art. Likewise, in the claims below, the term "instruction" may encompass an instruction in a RISC architecture or an instruction in a CISC architecture, as well as instructions used in other computer architectures. Other examples are readily ascertainable by one skilled in the art and may be made without departing from the spirit and scope of the present invention as defined by the following claims.

What is claimed is:

1. A hardware processor comprising:
   a plurality of programmable logic arrays (PLAs);
   an instruction pointer queue coupled to said plurality of PLAs;
   an instruction pointer sequencing logic/predictor component coupled to said instruction pointer queue;
   a micro-operation cache coupled to said instruction pointer sequencing logic/predictor component;
   a micro-operation memory coupled to said micro-operation cache, said micro-operation cache to store a subset of micro-operations to be stored in said micro-operation memory; and
   a trace pipe (TPIPE) coupled to said micro-operation cache and said instruction pointer queue, said trace pipe to assemble micro-operations for an instruction into an instruction trace to be forwarded for execution.

2. A hardware processor comprising:
   a plurality of programmable logic arrays (PLAs) wherein said plurality of PLAs are coupled to a plurality of streaming buffers and said plurality of PLAs are to provide an instruction pointer for a first micro-operation in each instruction and predict a number of micro-operations between the first micro-operation and a last micro-operation in each instruction;
   an instruction pointer queue coupled to said plurality of PLAs;
   an instruction pointer sequencing logic/predictor component coupled to said instruction pointer queue;
   a micro-operation cache coupled to said instruction pointer sequencing logic/predictor component;
   a micro-operation memory coupled to said micro-operation cache; and
   a trace pipe (TPIPE) coupled to said micro-operation cache and said instruction pointer queue.

3. The processor of claim 1 wherein said plurality of PLAs are coupled to an alias logic component.

4. The processor of claim 1 wherein said instruction pointer queue is to store said instruction pointer for said first micro-operation in each instruction.

5. The processor of claim 3 wherein said instruction pointer queue is at least three micro-instruction pointers wide.

6. The processor of claim 1 wherein said instruction pointer sequencing logic/predictor component comprises:
   a four-to-one multiplexer to receive a micro-instruction pointer from a PLA and output a micro-instruction pointer for a next micro-operation;
   a micro-instruction pointer predictor coupled to said four-to-one multiplexer, said micro-instruction pointer predictor to output a predicted next micro-instruction pointer to said multiplexer; and
   an incrementer component coupled to said four-to-one multiplexer, said incrementer component to output an incremental next micro-instruction pointer to said multiplexer.

7. The processor of claim 6 wherein said four-to-one multiplexer is further to receive a next micro-instruction pointer from said micro-operation memory.

8. The processor of claim 1 wherein said micro-operation cache comprises:
   an at least 3-wide micro-operation cache to store commonly used micro-operations.

9. The processor of claim 1 wherein said micro-operation memory comprises:
   an at least 3-wide micro-operation read only memory to store all micro-operations that can be decoded from an instruction set.

10. The processor of claim 1 further comprising:
    a patch cache coupled to said micro-operation cache.

11. A hardware processor comprising:
    a plurality of programmable logic arrays (PLAs) to output a first instruction pointer for a first micro-instruction operation in each instruction;
    an instruction pointer queue to receive the first instruction pointers;
    an instruction pointer sequencing logic/predictor component to predict a next instruction pointer for each instruction;
    a micro-operation cache to store a plurality of frequently used micro-instruction operations;
    a micro-operation memory to store a plurality of micro-instruction operations, said micro-operation cache to store a subset of micro-operations to be stored in said micro-operation memory; and
    a trace pipe (TPIPE) to assemble micro-operations for an instruction into an instruction trace to be forwarded for execution.

12. The processor of claim 11 wherein each of said plurality of PLAs to receive input from a build pipe.

13. The processor of claim 11 wherein each of said plurality of PLAs receive input from an alias logic component.

14. The processor of claim 11 wherein said instruction pointer queue is to store said instruction pointer for said first micro-operation in each instruction.

15. The processor of claim 14 wherein said instruction pointer queue is to concurrently provide up to three micro-instruction pointers.

16. The processor of claim 11 wherein said instruction pointer sequencing logic/predictor component comprises:
    a four-to-one multiplexer to receive a micro-instruction pointer from a PLA and output a micro-instruction pointer for a next micro-operation;
    a micro-instruction pointer predictor to output a predicted next micro-instruction pointer to said multiplexer; and
    an incrementer component to output an incremental next micro-instruction pointer to said multiplexer.

17. The processor of claim 16 wherein said four-to-one multiplexer is further to receive a next micro-instruction pointer from said micro-operation memory.

18. The processor of claim 11 wherein said micro-operation cache is to store at least 3 micro-operations per set of commonly used micro-operations.

19. The processor of claim 11 wherein said micro-operation read only memory is store at least 3 micro-operations per set of all micro-operations that can be decoded from an instruction set.

20. The processor of claim 11 further comprising:
    a patch cache to store micro-operations and to be read in parallel with said micro-operation memory.

21. A method comprising:
    storing in a cache a plurality of commonly used micro-operations;
    storing a plurality of micro-operations in a separate micro-operation memory, said cache storing a subset of the micro-operations stored in said separate micro-operation memory;

determining a first instruction pointer for a first operation in an instruction;
storing the first instruction pointer;
predicting a next instruction pointer for each additional operation in the instruction;
reading one or more operations in the instruction using the first instruction pointer and any predicted next instruction pointers; and
assembling trace with a trace pipe (TPIPE) micro-operations for an instruction into an instruction to be forwarded for execution.

22. The method of claim 21 wherein determining a first instruction pointer for a first operation in an instruction comprises:
determining the first instruction pointer for the first operation in the instruction in a programmable logic array.

23. The method of claim 21 wherein predicting a next instruction pointer for each additional operation in the instruction comprises:
predicting the next instruction pointer for each additional operation in the instruction in a predictor separate from the programmable logic array.

24. The method of claim 23 wherein reading one or more operations in the instruction using the first instruction pointer and any predicted next instruction pointers comprises:
reading the one or more operations in the instruction using the first instruction pointer and any predicted next instruction pointers from a cache memory or a read only memory, if the one or more operations are not in the cache memory.

25. A machine-readable memory having stored thereon a plurality of executable instructions to perform a method comprising:
storing in a cache a plurality of commonly used micro-operations;
storing a plurality of micro-operations in a separate micro-operation memory, said cache storing a subset of the micro-operations stored in said separate micro-operation memory;
determining a first instruction pointer for a first operation in an instruction;
storing the first instruction pointer;
predicting a next instruction pointer for each additional operation in the instruction;
reading one or more operations in the instruction using the first instruction pointer and any predicted next instruction pointers; and
assembling trace with a trace pipe (TPIPE) micro-operations for an instruction into an instruction to be forwarded for execution.

26. The machine-readable medium memory of claim 25 wherein determining a first instruction pointer for a first operation in an instruction comprises:
determining the first instruction pointer for the first operation in the instruction in a programmable logic array.

27. The machine-readable memory of claim 25 wherein predicting a next instruction pointer for each additional operation in the instruction comprises:
predicting the next instruction pointer for each additional operation in the instruction in a predictor separate from the programmable logic array.

28. The machine-readable medium memory of claim 27 wherein reading one or more operations in the instruction using the first instruction pointer and any predicted next instruction pointers comprises:
reading the one or more operations in the instruction using the first instruction pointer and any predicted next instruction pointers from a cache memory or a read only memory, if the one or more operations are not in the cache memory.

29. A computer system comprising:
a memory to provide program instructions; and
a hardware processor coupled to said memory, said processor comprising:
a plurality of programmable logic arrays (PLAs);
an instruction pointer queue coupled to said plurality of PLAs;
an instruction pointer sequencing logic/predictor component coupled to said instruction pointer queue;
a micro-operation cache coupled to said instruction pointer sequencing logic/predictor component;
a micro-operation memory coupled to said micro-operation cache, said micro-operation cache to store a subset of micro-operations to be stored in said micro-operation memory; and
a trace pipe (TPIPE) coupled to said micro-operation cache and said instruction pointer queue, said trace pipe to assemble micro-operations for an instruction into an instruction trace to be forwarded for execution.

30. A computer system comprising:
a memory to provide program instructions; and
a hardware processor coupled to said memory, said processor comprising:
a plurality of programmable logic arrays (PLAs), wherein said plurality of PLAs are coupled to a plurality of streaming buffers and said plurality of PLAs are to provide an instruction pointer for a first micro-operation in each program instruction and predict a number of micro-operations between the first micro-operation and a last micro-operation in each instruction;
an instruction pointer queue coupled to said plurality of PLAs;
an instruction pointer sequencing logic/predictor component coupled to said instruction pointer queue;
a micro-operation cache coupled to said instruction pointer sequencing logic/predictor component;
a micro-operation memory coupled to said micro-operation cache; and
a trace pipe (TPIPE) coupled to said micro-operation cache and said instruction pointer queue.

31. The computer system of claim 29 wherein said plurality of PLAs are coupled to an alias logic component.

32. The computer system of claim 29 wherein said instruction pointer queue is to store said instruction pointer for said first micro-operation in each instruction.

33. The computer system of claim 29 wherein said instruction pointer sequencing logic/predictor component comprises:
a four-to-one multiplexer to receive a micro-instruction pointer from a PLA and output a micro-instruction pointer for a next micro-operation;
a micro-instruction pointer predictor coupled to said four-to-one multiplexer, said micro-instruction pointer predictor to output a predicted next micro-instruction pointer to said multiplexer; and
an incrementer component coupled to said four-to-one multiplexer, said incrementer component to output an incremental next micro-instruction pointer to said multiplexer.

34. The computer system of claim 29 further comprising:
a patch cache coupled to said micro-operation cache.

35. A computer system comprising:
a memory to provide program instructions; and
  a hardware processor coupled to said memory, said processor comprising:
    a plurality of programmable logic arrays (PLAs) to output a first instruction pointer for a first micro-instruction operation in each instruction;
    an instruction pointer queue to receive the first instruction pointers;
    an instruction pointer sequencing logic/predictor component to predict a next instruction pointer for each instruction;
    a micro-operation cache to store a plurality of frequently used micro-instruction operations;
    a micro-operation memory to store a plurality of micro-instruction operations, said micro-operation cache to store a subset of micro-operations to be stored in said micro-operation memory; and
    a trace pipe (TPIPE) to assemble micro-operations for an instruction into an instruction trace to be forwarded for execution.

36. The computer system of claim 35 wherein each of said plurality of PLAs to receive input from a build pipe that is coupled to said memory.

37. The computer system of claim 35 wherein each of said plurality of PLAs receive input from an alias logic component.

38. The computer system of claim 35 wherein said instruction pointer queue is to store said instruction pointer for said first micro-operation in each instruction.

39. The computer system of claim 35 wherein said instruction pointer sequencing logic/predictor component comprises:
  a four-to-one multiplexer to receive a micro-instruction pointer from a PLA and output a micro-instruction pointer for a next micro-operation;
  a micro-instruction pointer predictor to output a predicted next micro-instruction pointer to said multiplexer; and
  an incrementer component to output an incremental next micro-instruction pointer to said multiplexer.

40. The computer system of claim 35 further comprising:
a patch cache to store micro-operations and to be read in parallel with said micro-operation memory.

* * * * *

UNITED STATES PATENT AND TRADEMARK OFFICE
CERTIFICATE OF CORRECTION

PATENT NO. : 7,519,799 B2 Page 1 of 1
APPLICATION NO. : 10/714674
DATED : April 14, 2009
INVENTOR(S) : Rebecca E. Hebda et al.

It is certified that error appears in the above-identified patent and that said Letters Patent is hereby corrected as shown below:

| Column | Line | |
|---|---|---|
| 9 | 51 | Before "memory" delete "medium". |
| 9 | 62 | Before "memory" delete "medium". |

Signed and Sealed this

Thirteenth Day of July, 2010

David J. Kappos
*Director of the United States Patent and Trademark Office*